United States Patent Office.

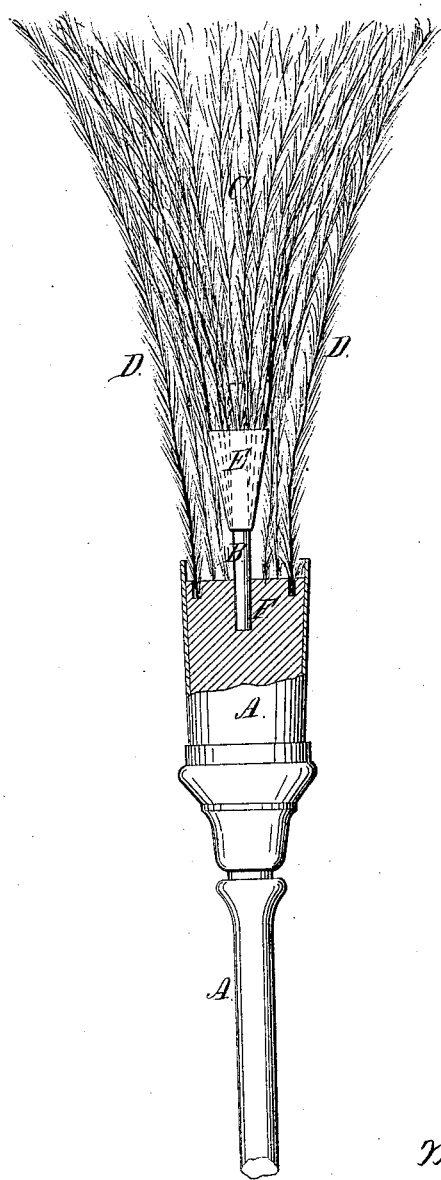

M. A. GOODENOUGH, OF NEW YORK, N. Y.

Letters Patent No. 77,278, dated April 28, 1868.

IMPROVED FEATHER DUSTER.

*The Schedule referred to in these Letters Patent and making part of the same.*

TO ALL WHOM IT MAY CONCERN:

Be it known that I, M. A. GOODENOUGH, of the city, county, and State of New York, have invented a new and useful Improvement in Feather Dusters; and I do hereby declare that the following is a full, clear, and exact description thereof, which will enable those skilled in the art to make and use the same, reference being had to the accompanying drawings, forming part of this specification.

The object of this invention is to so construct a feather duster that the centre of the brush shall be filled up with feathers of a less expensive quality than those used for the outside of the brush, and still make the brush elastic, more durable and useful than the ordinary kind; and the invention consists in an elastic stem, with feathers secured thereto, and attaching the elastic stem to the handle of the duster.

The drawing represents a longitudinal central section of a feather duster constructed according to my invention.

A represents the handle, and B the elastic stem.

C represents the feathers attached to the elastic stem B.

D represents the feathers which are attached directly to the handle A.

These dusters are made of South American ostrich-feathers, which (as imported) are of various lengths.

The longer feathers (suitable for the ordinary feather duster) are very expensive.

The dusters are consequently made with a single tier of feathers, inserted in the end of the handle, as seen in the drawing, the centre being left vacant.

Feather dusters have been made, and the centre filled with shorter feathers, by extending the centre of the handle between the outside feathers D, and then inserting shorter feathers in the end, but this method destroys the elasticity of the duster at the base of the feathers D; besides, the liability to strike, with the projecting end, the article dusted, renders the method very objectionable.

By attaching short feathers to an elastic stem, by binding or otherwise, and wrapping them around with paper, or other suitable material, as seen at E, and then inserting the stem in the end of the handle, as seen at F, every desired object is accomplished.

The centre of the duster is filled with cheaper feathers, which, for all useful purposes, take the place of the long feathers.

The duster is equally elastic, much more durable, while it can be afforded to the consumer at a reduced price.

More than one elastic stem with feathers attached may be inserted into the end of the handle for filling up the centre of the duster, if desired.

Having described my invention, what I claim as new, and desire to secure by Letters Patent, is—

In combination with a feather duster, the elastic stem B, arranged substantially as and for the purposes herein shown and described.

The above specification of my invention signed by me, this 23d day of March, 1868.

M. A. GOODENOUGH.

Witnesses:
　WM. F. McNAMARA,
　ALEX. F. ROBERTS.